US010085272B2

(12) United States Patent
Sun et al.

(10) Patent No.: US 10,085,272 B2
(45) Date of Patent: Sep. 25, 2018

(54) METHOD FOR ASSOCIATING A USER WITH A BASE STATION BASED ON BACKHAUL CAPACITY IN HETEROGENEOUS CELLULAR NETWORK

(71) Applicant: University of Electronic Science and Technology of China, Chengdu, Sichuan (CN)

(72) Inventors: Gang Sun, Sichuan (CN); Yueyue Dai, Sichuan (CN); Du Xu, Sichuan (CN); Dan Liao, Sichuan (CN); Hongfang Yu, Sichuan (CN)

(73) Assignee: UNIVERSITY OF ELECTRONIC SCIENCE AND TECHNOLOGY OF CHINA, Chengdu, Sichuan (CN)

( * ) Notice: Subject to any disclaimer, the term of this patent is extended or adjusted under 35 U.S.C. 154(b) by 0 days.

(21) Appl. No.: 15/809,840

(22) Filed: Nov. 10, 2017

(65) Prior Publication Data
US 2018/0227927 A1  Aug. 9, 2018

(30) Foreign Application Priority Data
Feb. 9, 2017  (CN) .......................... 2017 1 0071404

(51) Int. Cl.
*H04W 72/08* (2009.01)
*H04W 72/04* (2009.01)
(Continued)

(52) U.S. Cl.
CPC ......... *H04W 72/085* (2013.01); *H04W 24/10* (2013.01); *H04W 48/20* (2013.01);
(Continued)

(58) Field of Classification Search
CPC ............. H04W 72/085; H04W 72/082; H04W 72/0406; H04W 48/20; H04W 24/10; H04W 36/30
(Continued)

(56) References Cited

U.S. PATENT DOCUMENTS

| 2014/0160939 A1* | 6/2014 | Arad ...................... H04L 47/122 370/237 |
| 2016/0087768 A1* | 3/2016 | Yu ........................ H04L 5/0032 370/315 |

(Continued)

OTHER PUBLICATIONS

Beyranvand, H. et al. "Backhaul-Aware User Association in FiWi Enhanced LTE-A Heterogeneous Networks" IEEE Transactions on Wireless Communications, vol. 14, No. 6, Jun. 2015.
(Continued)

*Primary Examiner* — Inder Mehra
(74) *Attorney, Agent, or Firm* — U.S. Fairsky LLP; Yue (Robert) Xu (57) ABSTRACT

The present invention provides a method for associating a user with a base station based on backhaul capacity in heterogeneous cellular network. First, an available base station set is obtained through the SINRs, and the downlink data rate between the new user and each base station in the available base station set is calculated according to the SINR between them; Then, the usable link capacity factor of each base station is calculated based on the used link capacity and the backhaul capacity; Finally, the optimal base station is selected for the new user i under a constraint which is constructed by the bandwidth of the new user and the usable link capacity factor. The backhaul capacity of each base station is taken into account in selecting the optimal base station to associate with for the new user, thus the real time of user association and the overall performance of heterogeneous cellular network can be guaranteed.

2 Claims, 5 Drawing Sheets

(51) Int. Cl.
  *H04W 48/20* (2009.01)
  *H04W 24/10* (2009.01)
  *H04W 36/30* (2009.01)
(52) U.S. Cl.
  CPC .......... *H04W 72/082* (2013.01); *H04W 36/30* (2013.01); *H04W 72/0406* (2013.01)
(58) Field of Classification Search
  USPC .... 342/367; 455/452.2, 509, 62, 452.1, 454, 455/63.3, 421, 436, 437
  See application file for complete search history.

(56) References Cited

U.S. PATENT DOCUMENTS

2017/0055224 A1\* 2/2017 Boccardi ............... H04W 28/08
2017/0288936 A1\* 10/2017 Park ..................... H04L 27/362

OTHER PUBLICATIONS

Shen, K and Yu, W. "Distributed Pricing-Based User Association for Downlink Heterogeneous Cellular Networks" IEEE Journal on Selected Areas in Communications, vol. 32, No. 6, Jun. 2014.
Ye, Q. et al. "User Association for Load Balancing in Heterogeneous Cellular Networks" IEEE Transactions on Wireless Communications, vol. 12, No. 6, Jun. 2013.

\* cited by examiner

METHOD FOR ASSOCIATING A USER WITH A BASE STATION BASED ON BACKHAUL CAPACITY IN HETEROGENEOUS CELLULAR NETWORK

FIELD OF THE INVENTION

This application claims priority under the Paris Convention to Chinese Patent Application No. 201710071404.3, Filed Feb. 9, 2017, the entirety of which is hereby incorporated by reference for all purposes as if fully set forth herein.

The present invention relates to the field of the $5^{th}$-Generation mobile networks, more particularly to a method for associating a user with a base station based on backhaul capacity in heterogeneous cellular network.

BACKGROUND OF THE INVENTION

With the development of the cellular network technology from the $4^{th}$-Generation (4G) to the $5^{th}$-Generation (5G), in 5G's standard, the academia and the industry have formed a general consensus that as an important system indicator, the system capacity of 5G should be enhanced by 1000 times than that of 4G. To this end, the user's data rate can be enhanced from three aspects: spectrum efficiency, available bandwidth, and base station's dense deployment and cellular network's heterogeneity. Among them, the base station's dense deployment means deploying more base stations to reduce the coverage and load of each base station, thus providing more resource to user, and then the use's data rate can be enhanced. The implementation of the deployment of a heterogeneous cellular network is to deploy a large number of low-cost small base stations in the traditional macro-cell, and to migrate some users from the macro-cell to these small cells, i.e. these small base stations, which can reduce the loads of the macro base stations, and increase the amount of the resources allocated to user. Thus a heterogeneous network is formed. These small base stations may be micro base stations, pico base stations or femto base stations, which have the same licensed spectrum as that of the macro base stations, or the WiFi access points which set up in the unlicensed spectrum. By increasing the density of the base stations, the large scale deployment of small base stations improves the system capacity and realizes the spectrum reuse, meanwhile, the targeted deployment of small base stations could solve the user association problem in the edge area or the non-covered area of the macro base stations For each user, it has to select one base station to associate with, which is called user association. The user association also determines the load of each base station in a heterogeneous cellular network, and is a way to realize the efficient resource management. Therefore, the user association is crucial in heterogeneous cellular network. However, comparing to the use association in traditional cellular network, the user association in heterogeneous cellular network is more complex, for the base stations in heterogeneous cellular network are different in terms of transmission power, number of antennas and spectrum, and different types of base station often coexist.

In prior art, there already have many researches concerning to user association in heterogeneous cellular network. The most common method is to model the user association as an optimization problem, then to use optimization theory and algorithms to find the best association strategy. a variable of {0,1} is employed to express the relationship of user and base station, and based on which, a utility function is created, and then the user association is converted into the maximization of the utility function. The specific approach is to model the user association as an integer programming problem, solve this integer programming offline, and then get the optimal association solution. Since the integer programming problem has a integer variable {0,1}, such problem is usually taken as a NP-hard problem. Therefore, it is necessary to design an optimal solution or sub-optimal solution. Relaxation theory and Lagrange duality are typical methods to solve the NP-hard problem. In addition, user association and fairness are often joint considered. The specific approach is to choose a proportional fairness function as the utility function of the user association. The proportional fairness function is a logarithmic function. However, the method has several shortcomings as follows:

(1), Applying the above method in the real heterogeneous cellular network is almost impractical. Firstly, the above method requires to know a large amount of accurate information about the user and the base station in advance, such as the number of users of the whole network, the location of each user, and the each user's data rate, etc. Due to the dynamic and mobility of the cellular network, users are randomly arrived, thus little of such kind of accurate information can be obtained in advance. Secondly, the above algorithm is offline and runs slowly, but the cellular network needs the new arriving users to quickly access, it is obvious that the method is not real-time and not applicable.

(2), The above method do not take the limitation of the base station's backhaul capacity into account when considering the constraints. However, in reality, due to the rapid growth of wireless data traffic and wireless devices, the backhaul capacity has already become a bottleneck to the resource's utilization. When associating a user to a base station, it is necessary to add the backhaul capacity to the constraints.

Therefore, the research emphasis is how to provide a effective user association method under heterogeneous cellular network to guarantee the service demand of users and network performance.

SUMMARY OF THE INVENTION

The present invention aims to overcome the deficiencies of the prior art and provides a method for associating a user with a base station based on backhaul capacity in heterogeneous cellular network, the user association is performed according to the values of utility function between the new user and all base stations which can be associated with and the backhaul capacity of each base station, thus the real time of user association and the overall performance of heterogeneous cellular network can be guaranteed.

To achieve these objectives, in accordance with the present invention, a method for associating a user with a base station based on backhaul capacity in heterogeneous cellular network is provided, comprising:

(1). initializing the user set of each base station, i.e. letting $A_j \leftarrow \emptyset$; where $A_j$ is the user set of the base station j, j=1, 2, . . . , J, J is the number of base stations in a heterogeneous cellular network, $\emptyset$ is an empty set;

(2). calculating the downlink data rate between a new user and each base station upon the arrival of the new user;

2.1). calculating the SINR (Signal-to-Interference and Noise Ratio) between the new user and each base station, and denoting it as $SINR_{ij}$, where i is the serial number of the new user;

2.2). creating an available base station set for the new user:

$$UA_i = \{SINR_{ij} > \tau\};$$

where $UA_i$ is the available base station set of the new user i, τ is a SINR threshold, and the equation means that if the SINR between the new user i and the base station j is greater than the SINR threshold τ, the new user i can be associated with the base station j, the base station j is added to the available base station set $UA_i$;

2.3). calculating the downlink data rate between the new user and each available base station:

$$r_{ij}=\log(1+SINR_{ij}), j \in UA_i;$$

where $r_{ij}$ is the downlink data rate between the new user i and the base station j, the base station j belongs to the available base station set $UA_i$;

(3). calculating the used link capacity $B'_j$ of the base station j;

$$B'_j = \sum_{i' \in A_j} t_{i'j} r_{i'j}, j \in UA_i;$$

i.e. the used link capacity $B'_j$ of the base station j is the sum of all products of the data transmission time $t_{i'j}$ and downlink data rate $r_{i'j}$ of the users in user set $A_j$ of the base station j;

where i' is the serial number of a user in the user set $A_j$ of the base station j, $t_{i'j}$ is the data transmission time between the user i' and the base station j, the data transmission time $t_{i'j}$ equals to $1/N_j$, $N_j$ is the number of the users in the user set $A_j$ of the base station j, $r_{i'j}$ is the downlink data rate between the user i' and base station j, the base station j belongs to the available base station set $UA_i$;

(4). calculating the usable link capacity factor $\varphi_j$ of the base station j:

$$\varphi_j = 1 - e^{(B'_j/B_j - 1)}, j \in UA_i$$

where $B_j$ is the backhaul capacity of the base station j, the base station j belongs to the available base station set $UA_i$;

(5). calculating the bandwidth $b_{ij}$ of the new user i, if the new user i is associated with the base station j;

$$b_{ij}=t_{ij} r_{ij}, j \in UA_i$$

where $t_{ij}$ is the data transmission time between the new user i and the base station j, the data transmission time $t_{ij}$ equals to $1/(N_j+1)$, $N_j$ is the number of the users in the user set $A_j$ of the base station j, $r_{ij}$ is the downlink data rate between the new user i and base station j, the base station j belongs to the available base station set $UA_i$;

(6). selecting the optimal base station to associate with for the new user i;

where the optimal base station to associate with for the new user i should satisfy the following formula:

$$\mathrm{argmax}_{j \in UA_i} \log(b_{ij}) \times \varphi_j;$$

i.e. finding a base station j, i.e. the optimal base station in the available base station set $UA_i$, which satisfies that $\log(b_{ij}) \times \varphi_j$ is maximal, and here, the optimal base station is denoted by the base station $j_{opt}$;

(7). associating the new user i with the base station $j_{opt}$, and adding the new user i to the user set $A_{j_{opt}}$ of the base station $j_{opt}$, if the used link capacity $B'_{j_{opt}}$ of the base station $j_{opt}$ plus the bandwidth $b_{ij_{opt}}$ of the new user i is less than the backhaul capacity $B_{j_{opt}}$ of the optimal base station $j_{opt}$; or deleting the base station $j_{opt}$ from the available base station set $UA_i$ and returning to step (6).

The objectives of the present invention may be realized as follows:

In the present invention i.e. a method for associating a user with a base station based on backhaul capacity in heterogeneous cellular network. First, an available base station set is obtained through the SINRs between the new user and each base station in heterogeneous cellular network, and the downlink data rate between the new user and each base station in the available base station set is calculated according to the SINR between them; Then, the usable link capacity factor of each base station is calculated based on the used link capacity and the backhaul capacity; Finally, the optimal base station is selected for the new user i under a constraint which is constructed by the bandwidth of the new user and the usable link capacity factor. The backhaul capacity of each base station is taken into account in selecting the optimal base station to associate with for the new user, thus the real time of user association and the overall performance of heterogeneous cellular network can be guaranteed.

Meanwhile, the present invention has the following advantageous features:

(1). Practicability; In present invention, an effective online algorithm is provided for solving user association problem. Due to the dynamical arrival of the user in cellular network, all information about the user can not be known in advance, thus the traditional offline algorithm is not applicable to user association. The online algorithm in the present invention is more suitable for actual scene, more easy to operate and more practical.

(2). Real time; the online algorithm provided in present invention has characteristics of low complexity and fast running, and can allocate a base station for a user rapidly.

(3). Load balancing; When the used link capacities of the base stations which can be associated with the new user are different, the priority of allocating a base station to the new user will be given to the base station with low load, thus the load balancing of heterogeneous cellular network is realized.

(4). Good user experience; When the used link capacities of the base stations which can be associated with the new user are equal, the priority of allocating a base station to the new user will be given to the base station with best bandwidth, thus fully considering the user's experience, and enhancing the utilization of the whole cellular network's bandwidth. Moreover, the online algorithm provided in present invention guarantees that the used link capacity is less than the backhaul capacity, thus the stable user experience is guaranteed in a certain extent.

BRIEF DESCRIPTION OF THE DRAWING

The above and other objectives, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described with reference to the accompanying drawings. It should be noted that the similar modules are designated by similar reference numerals although they are illustrated in different drawings. Also, in the following description, a detailed description of known functions and configurations incorporated herein will be omitted when it may obscure the subject matter of the present invention.

Embodiment

For the purpose of describing, the relevant terms in the embodiment are explained as follows:
5G: 5th-Generation;
4G: 4th-Generation;
Wi-Fi: Wireless-Fidelity;
NP-hard: Non-deterministic Polynomial hard;
MEMO: Multiple-Input Multiple-Output;
xDSL: x Digital Subscriber Line;
ADSL: Asymmetric Digital Subscriber Line;
VDSL: Very High Speed Digital Subscriber Line;
ZFBF: Zero-Forcing Beamforming;
SDN: Software Defined Network.

Figure 1:
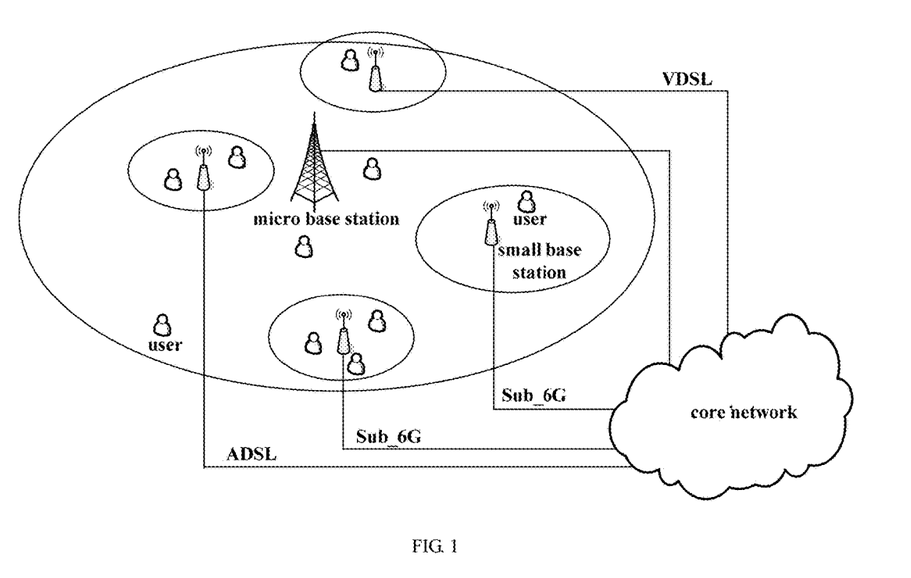
FIG. 1 is a diagram of base station's accesses to the core network with different backhaul links in a heterogeneous cellular network.

FIG. 1 is a diagram of base station's accesses to the core network with different backhaul links in a heterogeneous cellular network.

In one embodiment, the following three factors which can affect the user association is taken into account: number of the antennas of different types of base stations in a heterogeneous cellular network, the user's bandwidth and the backhaul capacity of base station.

In one embodiment, the base stations in a heterogeneous cellular network are divided into two categories according to the number of the antennas of base station, i.e. the MIMO base station with multiple antennas and the single antenna base station. the MIMO base station implements multiple-input and multiple-output through multiple antennas, which can more fully use the space resource and provide better communication quality. the single antenna base station has smaller size and lower cost, most of small base stations are single antenna base stations.

In one embodiment, the user's bandwidth is taken into account, when associating the user with a base station, For the user's bandwidth determines the quality of the service which the base station can provide for the user. The bandwidth allocated to a user by a base station is determined by two factors: the downlink data rate between the user and the base station, the service time (data transmission time) allocated to the user by the station. the downlink data rate between the user and the base station usually refers to the air link rate, it mainly determined by the SINR between the user and the base station. the service time allocated to the user by the station is inversely proportional to the number of the users associated with the base station, i.e. the number of the users in the user set of the base station, thus the more users associated with a base station, the less service time allocated to a user.

In one embodiment, the backhaul capacity of base station is taken as a constraint, when associating a user with a base station. As shown in FIG. 1, fiber link is used for the backhaul link of macro base station in the heterogeneous cellular network, therefore, its backhaul capacity is very high. However, the small base station in the heterogeneous cellular network usually uses xDSL (ADSL or VDSL) or Sub-6G to implement the backhaul link, therefore, its backhaul capacity is limited and smaller than that of fiber link several orders of magnitude, which means that if the bandwidth needs of the users associated with the small base station exceeds the backhaul capacity the backhaul link can afford, the quality of service provided by small base station can't be guaranteed. In addition, with the dramatic increase of cellular data traffics and cellular terminals, the macro base station also can't fully satisfy the bandwidth needs of its associated users with consideration of the backhaul capacity, thus, in the present invention, the backhaul capacity is taken as a constraint, when associating a user with a base station.

In one embodiment, based on the above mentioned three aspects, a method for associating a user with a base station based on backhaul capacity in heterogeneous cellular network is provided in accordance with the present invention. In terms of the overall network's performance, the method guarantees the full use of the whole heterogeneous cellular network's resource in consideration of the constraint of the base station's backhaul capacity; In terms of the single user's experience, the method provides the best bandwidth by selecting the optimal base station to associate with for new user.

Figure 2:
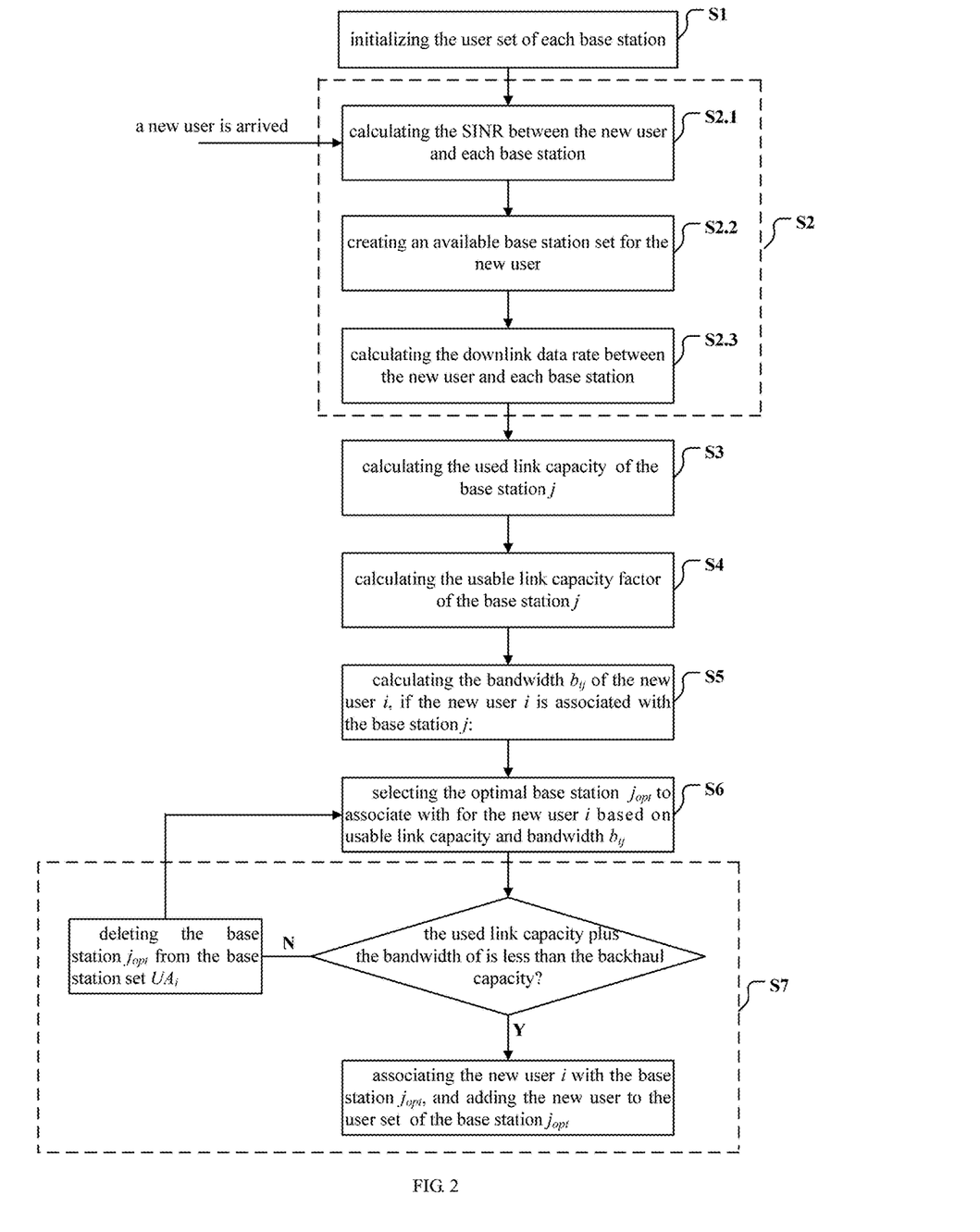
FIG. 2 is a flow diagram of associating a user with a base station based on backhaul capacity in heterogeneous cellular network in accordance with one embodiment of the present invention.

In one embodiment, As shown in FIG. 2, the method for associating a user with a base station based on backhaul capacity in heterogeneous cellular network comprises the following concrete steps:

Step S1: initializing the user set of each base station, i.e. letting $A_j \leftarrow \emptyset$; where $A_j$ is the user set of the base station j, j=1, 2, . . . , J, J is the number of base stations in a heterogeneous cellular network, $\emptyset$ is an empty set. As shown in FIG. 1, J=5.

Step S2: calculating the downlink data rate between a new user and each base station upon the arrival of the new user.

The arrival of the new user is random, and the position of the new user is also completely random.

To ensure the fairness of resource allocation, a proportional fair algorithm is employed to allocate the system resource in the present invention. Proportional fair algorithm defines its utility function as a log function, therefore, the present invention defines the utility function brought by a new user as $\log(b_{ij})$, where $b_{ij}$ is the bandwidth of the new user i, when the new user is associated with the base station j. The data transmission times each base station allocates to its associated users are identical, so the data transmission time $t_{ij}$ between the new user i and the base station j equals to $1/(N_j+1)$, where $N_j$ is the number of the users in the user set $A_j$ of the base station j.

Macro base station and small base station coexist in heterogeneous cellular network. Generally, macro base station employs MIMO to support multi-channel data transmission; some small base stations also employ MIMO such as 5G band Wi-Fi, but most of small base stations employ single antenna. the number of base station's antennas directly affect the SINR between the user and each base station, thus the SINR's calculations are different under different number of base station's antennas.

The concrete calculating of the downlink data rate is described as follows, comprising:

Step S2.1: calculating the SINR (Signal-to-Interference and Noise Ratio) between the new user and each base station, and denoting it as $SINR_{ij}$, where i is the serial number of the new user.

If the base station is a MIMO base station with K antennas, the new user has one antenna and the communication channel between the MIMO base station and the user employ ZFBF as precoding, the SINR between the new user i and the base station j is:

$$SINR_{ij} = \frac{p_j |h_i w_j|^2}{N_0 + I}$$

Where $N_0$ is the noise power, which may be a constant or random, here is −104 dBm; I is the interference power of the other (interfering) signals in the network, $p_j$ is the transmission power of the base station j; $h_j$ is a 1×K vector, and denotes the channel gain of the new user; $w_j$ is the Beam Steering Weight vector of the base station j;

If the base station is a single antenna base station and the new user has one antenna, the SINR between the new user i and the base station j is:

$$SINR_{ij} = \frac{p_j g_{ij}}{N_0 + I}$$

Where $g_{ij}$ is the channel gain between the new user i and the base station j, $N_0$ is the noise power, I is the interference power of the other (interfering) signals in the network.

Step S2.2: creating an available base station set for the new user:

$$UA_i = \{SINR_{ij} > \tau\};$$

Where $UA_i$ is the available base station set of the new user i, τ is a SINR threshold, here τ=3 dB. And the equation means that if the SINR between the new user and the base station j is greater than the SINR threshold τ, the new user i can be associated with the base station j, base station j is added to the available base station set $UA_i$.

Step S2.3: calculating the downlink data rate between the new user and each base station:

$$r_{ij} = \log(1 + SINR_{ij}), j \in UA_i;$$

Where $r_{ij}$ is the downlink data rate between the new user i and the base station j, the base station j belongs to the available base station set $UA_i$.

Step S3: calculating the used link capacity $B'_j$ of the base station j.

$$B'_j = \sum_{i' \in A_j} t_{i'j} r_{i'j}, j \in UA_i;$$

i.e. the used link capacity $B'_j$ of the base station j is the sum of all products of the data transmission time $t_{i'j}$ and downlink data rate $r_{i'j}$ of the users in user set $A_j$ of base station j.

Where i' is the serial number of a user in the user set $A_j$ of the base station j, $t_{i'j}$ is the data transmission time between the user i' and the base station j, the data transmission time $t_{i'j}$ equals to $1/N_j$, $N_j$ is the number of the users in the user set $A_j$ of the base station j, $r_{i'j}$ is the downlink data rate between the user i' and base station j, the base station j belongs to the available base station set $UA_i$.

Step S4: calculating the usable link capacity factor $\varphi_j$ of the base station j:

$$\varphi_j = 1 - e^{(B'_j/B_j - 1)}, j \in UA_i$$

Where $B_j$ is the backhaul capacity of the base station j, the base station j belongs to the available base station set $UA_i$.

The usable link capacity factor $\varphi_j$ is a monotone decreasing function, and denotes the unused degree of the link capacity of the base station j. The physical meanings of the usable link capacity factor is: 1) when the base station j is under a low load (the number of the users associated with the base station j is less), its value is greater; when the base station j is under a heavy load (the number of the users associated with the base station j is greater), its value is less; 2) the necessary and sufficient condition for guaranteeing the usable link capacity factor $\varphi_j \geq 0$ is $B'_j/B_j \leq 1$, i.e. the sum of all associated user's bandwidths of a base station can exceed the backhaul capacity of the base station.

Step S5: calculating the bandwidth $b_{ij}$ of the new user i, if the new user i is associated with the base station j:

$$b_{ij} = t_{ij} r_{ij}, j \in UA_i$$

Where $t_{ij}$ is the data transmission time between the new user i and the base station j, the data transmission time $t_{ij}$ equals to $1/(N_j+1)$, is the number of the users in the user set $A_j$ of the base station j, $r_{ij}$ is the downlink data rate between the new user i and base station j, the base station j belongs to the available base station set $UA_i$. The equation means that the bandwidth $b_{ij}$ of the new user i is determined by two factors: the data transmission time $t_{ij}$ and downlink data rate $r_{ij}$ between the new user i and the base station j.

Step S6: selecting the optimal base station to associate with for the new user i.

Where the optimal base station to associate with for the new user i should satisfy the following formula:

$$\arg\max_{j \in UA_i} \log(b_{ij}) \times \varphi_j;$$

i.e. finding a base station j, i.e. the optimal base station in the available base station set UA which satisfies that log $(b_{ij}) \times \varphi_j$ is maximal, and here, the optimal base station is denoted by the base station $j_{opt}$.

Step S7: associating the new user i with the base station $j_{opt}$, and adding the new user i to the user set $A_{j_{opt}}$ of the base station $j_{opt}$, if the used link capacity $B'_{j_{opt}}$ of the base station $j_{opt}$ plus the bandwidth $b_{ij_{opt}}$ of the new user i is less than the backhaul capacity $B_{j_{opt}}$ of the optimal base station $j_{opt}$; or deleting the base station $j_{opt}$ from the available base station set $UA_i$ and returning to Step S6.

When the utility functions $\log(b_{ij})$ between the new user and all base stations in the available base station set $UA_i$ are identical, the base station under low load (the value of $\varphi_j$ is maximal) will be selected for the new user to associate with, which ensure that the whole network resources has been fully used, thus the load balancing of heterogeneous cellular network is realized. When the used link capacities of the base stations which can be associated with the new user are equal, the priority of allocating a base station to the new user will be given to the base station with best bandwidth (the value of log(b) is maximal), thus the best user experience is provided to the new user. Meanwhile, to expedite the selection of the optimal base station, a SINR threshold is set, only the base station which SINR is greater than the SINR threshold will be taken into the range of selecting.

Simulation

Figure 3:
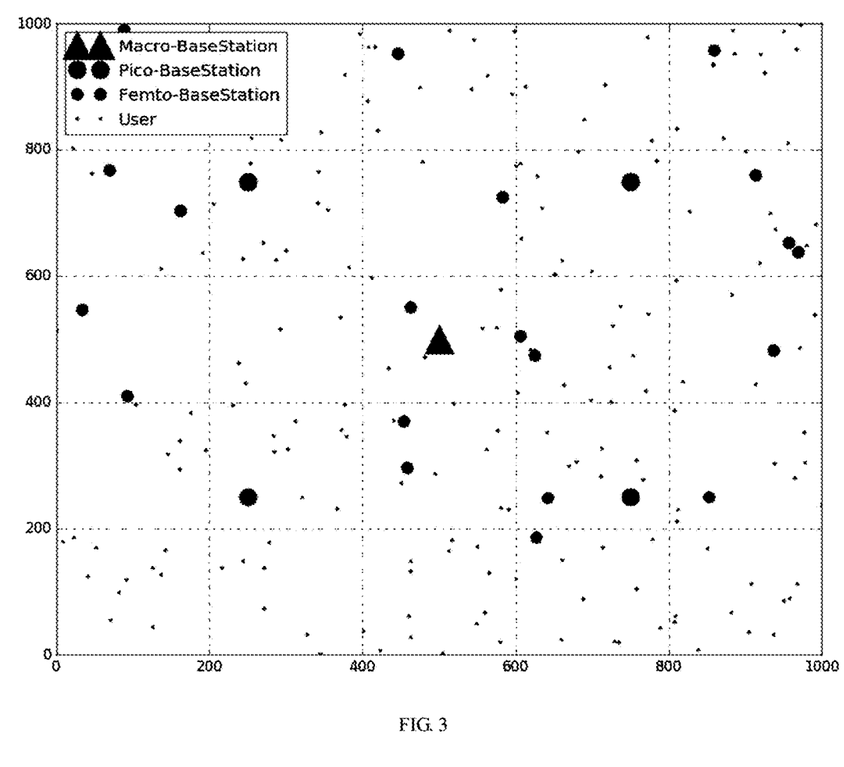
FIG. 3 is a diagram of another heterogeneous cellular network which is used for simulation.

As shown in FIG. 3, a heterogeneous cellular network with an area of 1000 m*1000 m is provided to verify the result and performance of the present invention.

In the area shown in FIG. 3, one macro base station, four Pico base stations and twenty femto-base stations are deployed. The locations of the macro-base station and pico-base stations are fixed, the locations of the femto-base stations are random. We assume that there are 200 randomly arrived users who attempt to be associated with one and only one base station in this area. The backhaul capacities of the macro-base station, pico-base stations and femto-base stations are 100 Mbps, 100/3 Mbps and 10 Mbps respectively, and 3GPP LTE parameters for simulation are listed in Table 1.

TABLE 1

| Parameter | Value |
|---|---|
| Minimum distance between macro-base station and user | 35 m |
| Minimum distance between pico/femto-base station and user | 10 m |
| Path loss model for macro-base station and user | 128.1 + 37.6log$_{10}$(d), d is in km |
| Path loss model for pico/femto-base station and user | 140.7 + 36.7log10(d), d is in km |
| Maximum macro-base station transmit power | 43 dBm |
| Maximum pico-base station transmit power | 24 dBm |
| Maximum femto-base station transmit power | 20 dBm |
| Noise power | −104 dBm |

Figure 4:
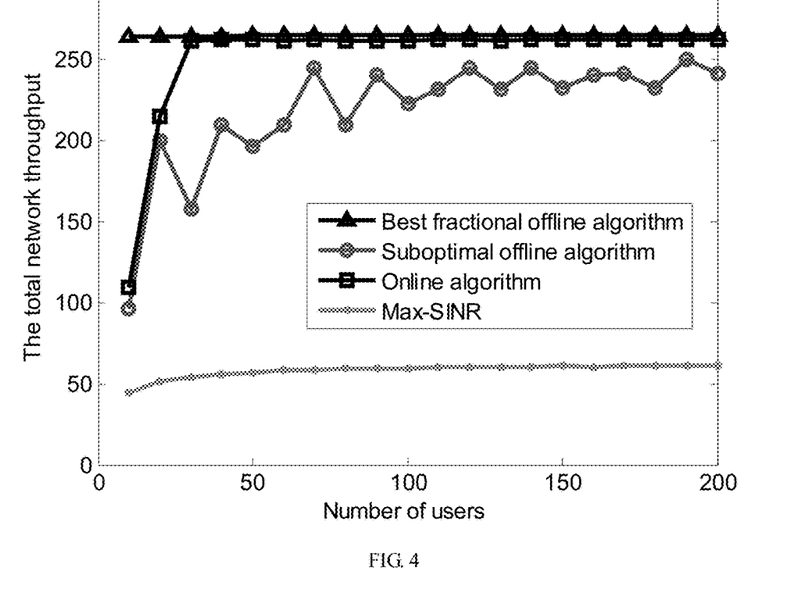
FIG. 4 is a diagram of the curves which illustrate the total network throughputs of the four user association algorithms.
Figure 5:
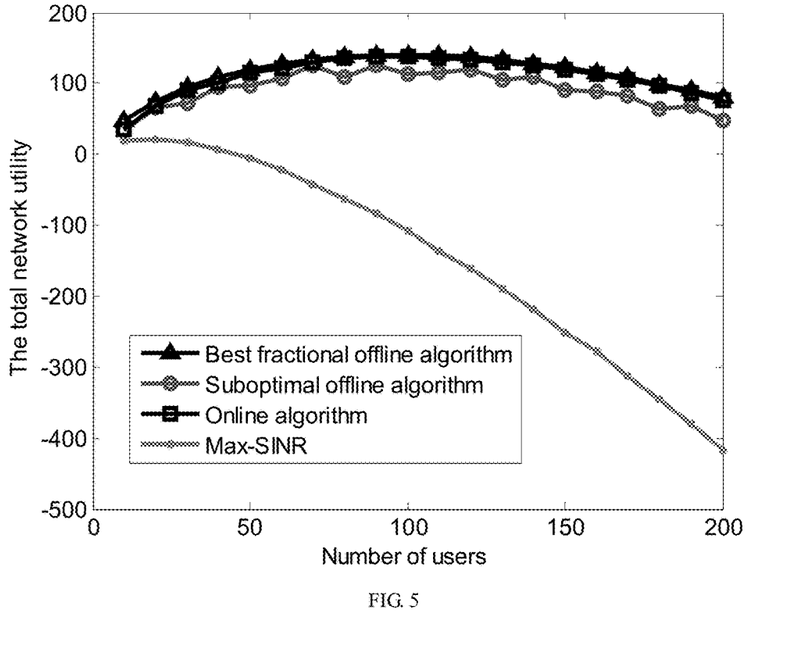
FIG. 5 is a diagram of the curves which illustrate the total network utilities of the four user association algorithms.
Figure 6:
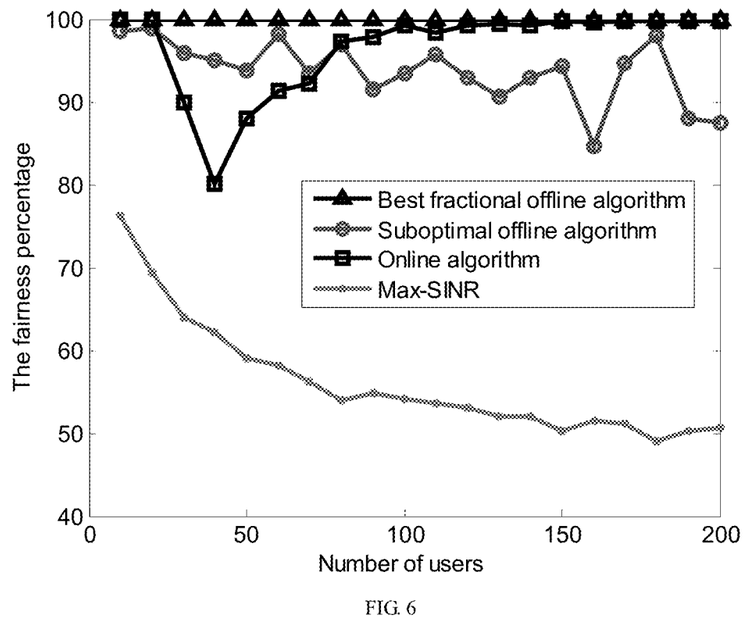
FIG. 6 is a diagram of the curves which illustrate the fairness performances of the four user association algorithms.

In FIG. 4~FIG. 6, there are 4 four user association algorithms. Among them, the online algorithm is the present invention. the online algorithm balances the backhaul capacity and network utility, thus it is fastest. Other algorithms are used for comparison; the best fractional offline algorithm is the optimal solution, but it cannot be used in a real wireless network, for the solution is not integral, generally, this solution is an upper bound that could indicate the performance of other algorithms; The suboptimal offline algorithm is an extension of the best fractional offline algorithm, it can be deployed in practical scene, but this algorithm is slow and need to acquire all users' information; the Max-SINR is the most widely used association algorithm, it is also fast and easy to realize. the 4 four user association algorithms are evaluated in terms of network throughput, utility, fairness and average user data rate.

FIG. 4 illustrates the total network throughputs when using the above four user association algorithms respectively. The best fractional offline algorithm is the upper bound. From the figure, it can be seen that the results of the online algorithm outperform that of suboptimal offline algorithm and Max-SINR. For each arrived user, the online algorithm selects a base station which provides the max log($b_{ij}$) and avoids that the backhaul capacity of the base station is already used up. Meanwhile, the online algorithm also consider the impact of base station's load and SINR on user association. The suboptimal offline algorithm also consider the impact of base station's load and SINR on user association, but it may select one base station with exhausted backhaul capacity. The performance of Max-SINR is the worst because it only consider the impact of SINR.

FIG. 5 illustrates the total network utilities when using the above four user association algorithms respectively. Here the utility function is log$_2$(•). If the user data rate is lower than 2, this value is negative. From the results shown in FIG. 5, we can see the performance of the Max-SINR is worst, the most network utility values of Max-SINR are negative and the trend is almost linearly decrease. The reason is that other three algorithms has considered how to maximize the network utility but the Max-SINR is not.

FIG. 6 illustrates the fairness performances of the four user algorithms. As shown in FIG. 6, the Max-SINR is the worst. What is noteworthy is the result trend of the suboptimal offline algorithm and online algorithm. When the number of users is lower than 80, the fairness of the suboptimal offline algorithm is better than that of the online algorithm. However, when the number of users is greater than 80, the fairness of the online algorithm is better than that of the suboptimal offline algorithm, moreover, the result of the online algorithm is more stable. The reason is that when there are not a lot of users, the backhaul capacity is not the bottleneck, the online algorithm is no need to balance so the impact of log(b) is larger. Once the backhaul capacity becomes the bottleneck, the balance of the online algorithm becomes remarkable and the effect of the online algorithm is better and more stable than that of the suboptimal offline algorithm.

Figure 7:
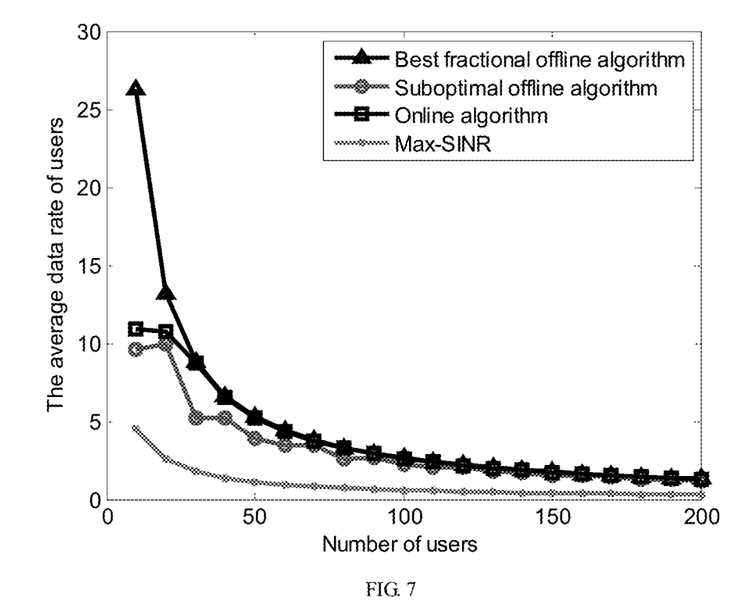
FIG. 7 is a diagram of the curves which illustrate the average data rate of users of the four user association algorithms.

FIG. 7 illustrates the average data rate of users when using the four algorithms respectively. As shown in FIG. 7, the average data rate of users decreases with the increase of the number of users. As a whole, the average data rate of users of the Max-SINR is smaller than that of others. When there are a few users, the average data rate of users of the online algorithm is slightly larger than that of the suboptimal offline algorithm, for the online algorithm is prone to select the base station with the largest log($b_{ij}$).

Comparing to the offline algorithms, the online algorithm, i.e. the present invention is easier to implement, deploy and more practical. Moreover, it is faster and with low complexity. Comparing to the Max-SINR algorithm and suboptimal offline algorithm, the network throughput and utility of the online algorithm are closer to upper bound, so it can provide the best performance. Further, it also balanced and stable.

While illustrative embodiments of the invention have been described above, it is, of course, understand that various modifications will be apparent to those of ordinary skill in the art. Such modifications are within the spirit and scope of the invention, which is limited and defined only by the appended claims.

What is claimed is:

1. A method for associating a user with a base station based on backhaul capacity in heterogeneous cellular network, comprising:
   (1). initializing the user set of each base station: letting $A_j \leftarrow \Phi$; where $A_j$ is the user set of the base station j, j=1, 2, . . . , J, J is the number of base stations in a heterogeneous cellular network, $\Phi$ is an empty set;
   (2). calculating the downlink data rate between a new user and each base station upon the arrival of the new user;
   2.1). calculating the SINR (Signal-to-Interference and Noise Ratio) between the new user and each base station, and denoting it as SINR$_{ij}$, where i is the serial number of the new user;
   2.2). creating an available base station set for the new user according to the following equation:

$UA_i = \{SINR_{ij} > \tau\};$ where $UA_i$ is the available base station set of the new user i, $\tau$ is a SINR threshold, and the equation means that if the SINR between the new user i and the base station j is greater than the SINR threshold $\tau$, the new user i can be associated with the base station j, the base station j is added to the available base station set $UA_i$;

2.3). calculating the downlink data rate between the new user and each base station according to the following equation:

$$r_{ij}=\log(1+SINR_{ij}), j \in UA_i;$$

where $r_{ij}$ is the downlink data rate between the new user i and the base station j, the base station j belongs to the available base station set $UA_i$;

(3). calculating the used link capacity $B'_j$ of the base station j according to the following equation:

$$B'_j = \sum_{i' \in A_j} t_{i'j} r_{i'j} \, j \in UA_i;$$

where i' is the serial number of a user in the user set $A_j$ of the base station j, $t_{i'j}$ is the data transmission time between the user i' and the base station j, the data transmission time $t_{i'j}$ equals to $1/N_j$, $N_j$ is the number of the users in the user set $A_j$ of the base station j, $r_{i'j}$ is the downlink data rate between the user i' and base station j, the base station j belongs to the available base station set $UA_i$;

(4). calculating the usable link capacity factor $\varphi_j$ of the base station j according to the following equation:

$$\varphi_j = 1 - e^{(B'_j - B_j - 1)} \, j \in UA_i;$$

where $B_j$ is the backhaul capacity of the base station j, the base station j belongs to the available base station set $UA_i$;

(5). calculating the bandwidth $b_{ij}$ of the new user i, if the new user i is associated with the base station j, according to the following equation:

$$b_{ij}=t_{ij}r_{ij} \, j \in UA_i$$

where $t_{ij}$ is the data transmission time between the new user i and the base station j, the data transmission time $t_{ij}$ equals to $1/(N_j+1)$, $N_j$ is the number of the users in the user set $A_j$ of the base station j, $r_{ij}$ is the downlink data rate between the new user i and base station j, the base station j belongs to the available base station set $UA_i$;

(6). selecting the optimal base station to associate with for the new user i, where the optimal base station to associate with for the new user i should satisfy the following formula:

$$\operatorname{argmax}_{j \in UA_i} \log(b_{ij}) \times \varphi_j;$$

and the optimal base station is denoted by the base station $j_{opt}$;

(7). associating the new user i with the base station $j_{opt}$, and adding the new user i to the user set $A_{j_{opt}}$ of the base station $j_{opt}$, if the used link capacity $B'_{j_{opt}}$ of the base station $j_{opt}$ plus the bandwidth $b_{ij_{opt}}$ of the new user i is less than the backhaul capacity $B_{j_{opt}}$ of the optimal base station $j_{opt}$; or deleting the base station $j_{opt}$ from the available base station set $UA_i$ and returning to step (6).

2. The method for associating a user with a base station based on backhaul capacity in heterogeneous cellular network of claim 1, wherein the SINR threshold equals to 3 dB.

* * * * *